(12) United States Patent
Dong et al.

(10) Patent No.: US 8,909,193 B2
(45) Date of Patent: Dec. 9, 2014

(54) AUTHENTICATION METHOD

(75) Inventors: Kunyang Dong, Shenzhen (CN);
Zhengwei Wang, Shenzhen (CN);
Chunyan Zhou, Shenzhen (CN);
Shangbin Wang, Shenzhen (CN);
Zhiming Zhu, Shenzhen (CN);
Tianzhen Huang, Shenzhen (CN); Jie Kong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1574 days.

(21) Appl. No.: 11/612,314

(22) Filed: Dec. 18, 2006

(65) Prior Publication Data

US 2007/0173229 A1     Jul. 26, 2007

Related U.S. Application Data

(63) Continuation of application No. PCT/CN2005/001767, filed on Oct. 26, 2005.

(30) Foreign Application Priority Data

Oct. 27, 2004   (CN) .......................... 2004 1 0087881

(51) Int. Cl.
*H04M 1/66* (2006.01)
*H04L 29/06* (2006.01)
*H04W 12/06* (2009.01)

(52) U.S. Cl.
CPC ........ *H04L 63/0853* (2013.01); *H04L 63/0876* (2013.01); *H04W 12/06* (2013.01)
USPC .......................... 455/410; 455/411; 455/456.1

(58) Field of Classification Search
USPC .......... 455/410, 411, 435, 456; 380/247, 270, 380/272
See application file for complete search history.

(56) References Cited

U.S. PATENT DOCUMENTS

2002/0114469 A1 * 8/2002 Faccin et al. .................. 380/270
2002/0187808 A1   12/2002 Vallstrom et al.
(Continued)

FOREIGN PATENT DOCUMENTS

| CN | 1209939 A | 3/1999 |
|---|---|---|
| CN | 1419793 A | 5/2003 |

OTHER PUBLICATIONS

USECA: UMTS Security Architecture, ac336/atea/wp23/ds/p/08/1, available Aug. 12, 1999, downloaded online from http://www.cs.mdx.ac.uk/staffpages/m_cheng/link/vinck99useca.pdf downloaded Jun. 17, 2009.*

(Continued)

*Primary Examiner* — Manpreet Matharu
(74) *Attorney, Agent, or Firm* — Leydig, Voit & Mayer, Ltd.

(57) ABSTRACT

A method for network equipment to generate authentication information in the mobile communication system, at least includes the following process: set security key corresponding to mobile terminal in network equipment; and network equipment generates authentication information corresponding to mobile terminal based on said security key and a random number. And, a method for mobile terminal to authenticate communication network in the mobile communication network, at least includes the following process: set security key corresponding to mobile terminal in the mobile terminal; and after the authentication information from network equipment is received, the mobile terminal determines whether the network authentication succeeds based on said security key set by the mobile terminal and the authentication information. An authentication method in mobile communication network is also disclosed, and includes the following process: the mobile terminal authenticates the network, and the network authenticates the mobile terminal.

9 Claims, 8 Drawing Sheets

(56) References Cited

U.S. PATENT DOCUMENTS

2003/0101345 A1     5/2003    Nyberg
2004/0111616 A1     6/2004    Adi
2005/0272406 A1*   12/2005   Mizikovsky et al. ......... 455/411

OTHER PUBLICATIONS

*ETSI Standards*, 3-SA3(V520) (Jun. 2003).

Schaefer et al., (2001), http://www.gallileus.info/gallileus/members/m_HolgerKarl/publications.

European Telecommunications Standards Institute, "Digital cellular telecommunications system (Phase 2+); security related network functions," Global System for Mobile Communications (GSM®) version 7.2.0 Release 1998, GSM 03.20 V7.2.0 (Nov. 1999).

3RD Generation Partnership Project (3GPP™), "Technical specification group core network; digital cellular telecommunications system (Phase 2+); mobile application part (MAP) specification (Release 1998)," 3GPP TS 09.02 V7.12.0 (Dec. 2002).

3RD Generation Partnership Project (3GPP™), "Technical specification group services and system aspects; 3G security; security architecture (Release 5)," 3GPP TS 33.102 V5.3.0 (Sep. 2003).

3RD Generation Partnership Project (3GPP™), "Technical specification group core network; mobile application part (MAP) specification (Release 6)," 3GPP TS 29.002 V6.5.0 (Mar. 2004).

European Patent Office, Examination Report in European Patent Application No. 05802192.4 (Mar. 20, 2008).

European Patent Office, Examination Report in European Patent Application No. 05802192.4 (Nov. 6, 2008).

State Intellectual Property Office of the People'S Republic of China, Examination Report in Chinese Patent Application No. 2004100878811 (May 22, 2009).

State Intellectual Property Office of the People'S Republic of China, Examination Report in Chinese Patent Application No. 2004100878811 Sep. 4, 2009).

* cited by examiner ional network equipment construction are required for this
AUTHENTICATION METHOD This application is a continuation of International Patent Application No. PCT/CN2005/001767, filed Oct. 26, 2005, which claims priority to Chinese Patent Application No. 200410087881.1, filed Oct. 27, 2004, all of which are hereby incorporated by reference.

FIELD OF THE TECHNOLOGY

The present invention relates to an authentication method, particularly, to a method for network equipment to generate authentication information in a mobile communication system, a method for a mobile terminal to authenticate the network in the mobile communication system and an authentication method in the mobile communication system.

BACKGROUND OF THE INVENTION

Most of the mobile terminals at present adopt removable cards, i.e. a mobile terminal and a user card storing information for authenticating wireless network users are two independent components that are combined together in application. The majority of the user cards are subscriber identity module cards, such as the subscriber identity module (SIM) card in the global system for mobile communications (GSM), the universal subscriber identity module (USIM) card in the wideband code division multiple access (WCDMA) communication system and the user identity module (UIM) card in the code division multiple access (CDMA) communication system. Such method has many notable advantages, for example, when a user wants to change his mobile terminal, he just buys a new mobile terminal and inserts the original SIM card into the new mobile terminal. As the user information does not need to be changed, the user does not need to go through any procedures of changing mobile terminal with the operator. Another notable advantage of the method is that the mobile services such as issuing numbers by mobile operators are well separated from the sales of mobile terminals, which facilitates the development of mobile services and keeps the sales of mobile terminal comparatively independent, therefore both the mobile service operations and mobile terminal sales are kept flexible to a great extent.

The separation of mobile terminal from user card brings convenience to users as well as to robbery and theft of mobile terminal to the extent that people dare not carry a mobile terminal on the waist. As a mobile terminal is designed to be separated from a user card, a stolen mobile terminal can be used without any trouble with a new SIM card inserted, thus robbers and thieves may profit from selling the stolen mobile terminal. The legal user of the stolen mobile terminal not only suffers economic loss, but also has to go through a series of procedures such as subscription information modification with the operator, which brings great inconvenience to the user. Moreover, when a mobile terminal is lost, the frequently used information that is stored in the mobile terminal, e.g. directory, is also lost, which badly affects the work and daily life of the user.

A common method to enhance the security of the mobile terminal is setting password for a mobile terminal. For example, when a start-up password is set in a mobile terminal, only after the correct password is keyed in at the start-up of the mobile terminal shall the mobile terminal go on with follow-up operations such as network registration. The mobile terminal will not start working when a wrong password is inputted. In this way the one who steals a mobile terminal cannot use or sell the mobile terminal because he does not know the password. It thus enhances the security of the mobile terminal to some extent. However, when such method is adopted, the legal user of the mobile terminal also has to input the password every time he turns on the mobile terminal, which brings great inconvenience to the user. In fact, many users feel it too much a trouble to key in a password every time at the start-up of a mobile terminal, such that they just do not set the password. Therefore it is hard for users to accept and actually employ the above method; hence it does not enhance the security of the mobile terminal at root.

Another method to cope with the security problem of the mobile terminal is setting up a great number of equipment identification registers (EIR) and recording the international mobile equipment identifiers (IMEI) of stolen mobile terminals in the blacklist of the corresponding EIR. When a mobile terminal logs in a network at start-up, it reports its IMEI to the network and corresponding network equipment has to check an EIR and determine whether the IMEI of the mobile terminal is in the blacklist; if the IMEI of the mobile terminal is found in the blacklist, the network shall deem that the mobile terminal is a stolen one and the user of the mobile terminal is an illegal user, and shall thus refuse to provide network services. In such way the one who steals a mobile terminal cannot profit from the mobile terminal as the mobile terminal can not be used, thus it enhances the security of the mobile terminal at root. However, a great number of EIRs and additional network equipment construction are required for this method, which brings not only additional cost, but also inconvenience to network operators. Besides, the software in the stolen mobile terminal can be modified, which enables the mobile terminal to report a fake IMEI to cheat the network, and make it impossible for the network to verify whether the mobile terminal is a stolen one.

Through an authentication method used at present in some mobile communication networks such as the universal mobile telecommunication system (UMTS) of the 3rd Generation mobile communication network, a user card can authenticate a mobile communication network; if the authentication succeeds, the user card will function properly, otherwise the user card will not function normally in the mobile communication network. However, such method does not solve the security problem of the mobile terminal although it enhances the security of the user card in a mobile terminal. The security problem of the mobile terminal is still existed.

SUMMARY OF THE INVENTION

An embodiment of the present invention provides a method for generating authentication information by the equipment in the network side of a mobile communication system so that a mobile terminal may authenticate a network in order to enhance the security of the mobile terminal.

An embodiment of the present invention also provides a method for a mobile terminal in a mobile communication system to authenticate the network in order to enhance the security of the mobile terminal.

An embodiment of the present invention provides an authentication method in a mobile communication system, allowing a mobile terminal to authenticate a network in order to enhance the security of the mobile terminal.

A method for generating authentication information by network equipment in a mobile communication system includes the following processes:

set a security key in a network equipment corresponding to a mobile terminal;

the network equipment generates authentication information corresponding to the mobile terminal based on the security key and a random number.

A method for a mobile terminal to authenticate a network in a mobile communication system includes the following processes:

set in a mobile terminal a security key corresponding to a mobile terminal;

upon receiving authentication information from a network equipment, the mobile terminal determines whether a network authentication succeeds based on the security key set by the mobile terminal itself and the authentication information.

An authentication method in a mobile communication network at least includes the following processes:

set a security key corresponding to a mobile terminal in the mobile terminal and a network equipment respectively;

the network equipment generates authentication information corresponding to the mobile terminal by based on the security key and a random number;

the network equipment sends the authentication information to the mobile terminal by the network equipment;

the mobile terminal determines whether the network authentication succeeds based on the security key set by the mobile terminal and the authentication information.

EMBODIMENTS OF THE INVENTION

A detailed description of the present invention is provided hereinafter with reference to the accompanying drawings and specific embodiments.

Figure 1:
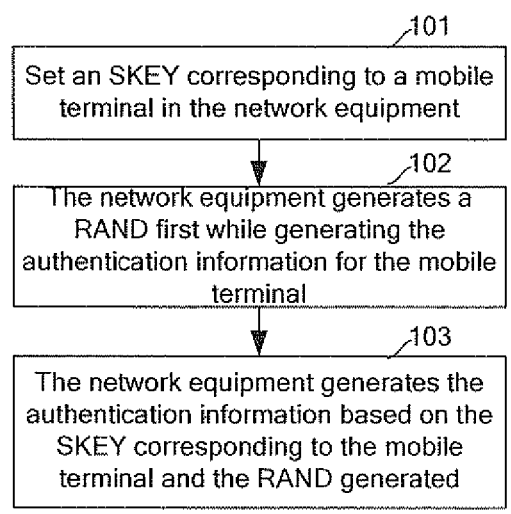
FIG. 1 is an overall flow chart of the network equipment generating the authentication information in accordance with an embodiment of the present invention.

FIG. 1 is an overall flow chart of the network equipment generating the authentication information in accordance with an embodiment of the present invention. As shown in FIG. 1, a security key (SKEY) corresponding to a mobile terminal is set in the network equipment in Step 101.

The setting of the SKEY corresponding to a mobile terminal may be setting of the SKEY of characteristic information of the mobile terminal, such as the SKEY corresponding to IMEI, and the SKEY may also correspond to subscription information of the mobile terminal user, or the characteristic information of the user card in the mobile terminal, such as the SKEY corresponding to IMSI or the SKEY corresponding to the serial number of the user card in the mobile terminal or the SKEY corresponding to the MSISDN (Mobile Station International ISDN Number).

In Step 102, the network equipment generates a random number (RAND) first when generating the authentication information for the mobile terminal.

In Step 103, the network equipment generates the authentication information based on the SKEY corresponding to the mobile terminal and the RAND generated.

The authentication information in this embodiment of the present invention includes the random number and an authentication token (AUTN). The AUTN includes at least a serial number (SQN) and a message authentication code (MAC), and may further include an authentication management field (AMP). The AMP and the SQN are not obtained based on the SKEY and the RAND, but are set in the network equipment. During the generation of the authentication information, the MAC in the AUTN is generated, and the AUTN is obtained through combining the existing SQN, AMF and the calculated MAC.

Figure 2:
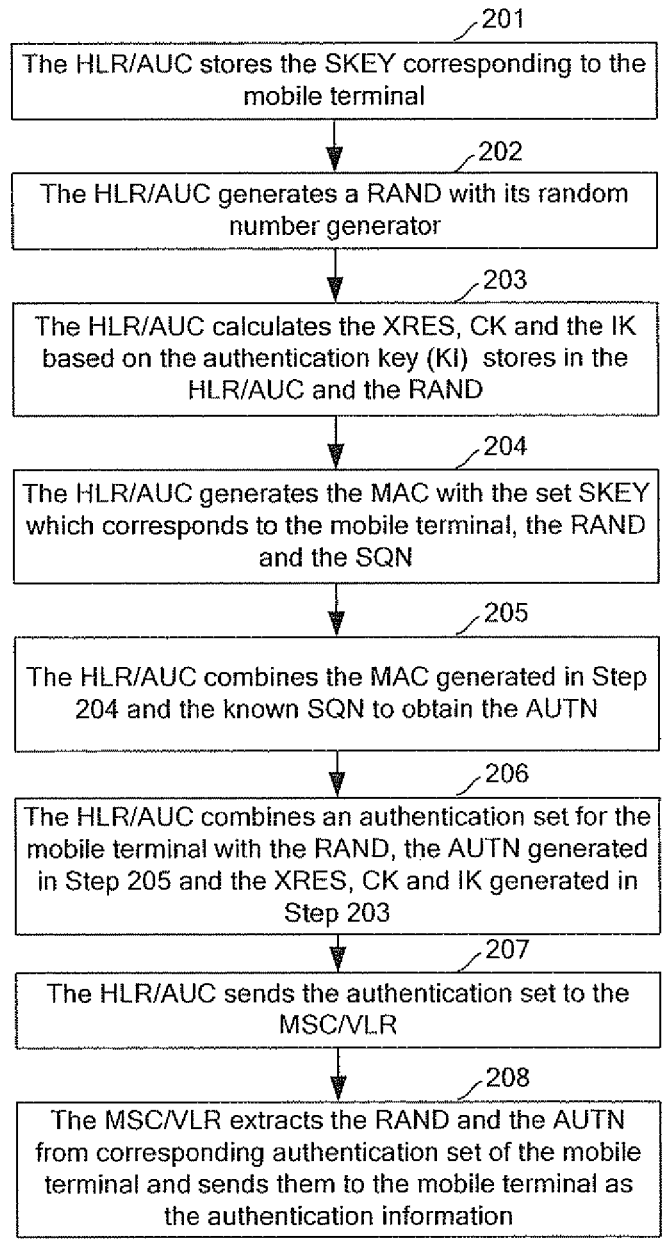
FIG. 2 is a flow chart of the network equipment generating the authentication information in accordance with an embodiment of the present invention.

The process in this embodiment of the present invention for generating the authentication information by the network equipment includes two steps: first, an HLR/AUC generates an authentication set including the authentication information and other information, and the authentication set is sent to an MSC/VLR; second, the MSC/VLR extracts the authentication information in the authentication set and the extracted information is sent to the mobile terminal. FIG. 2 shows the detailed processes.

The authentication set includes, besides the RAND and the AUTN, an expected response (XRES), an encryption key (CK) and an integrality key (IK). The XRES, CK and IK are sent to the MSC/VLR and stored there; the XRES is used for authenticating the mobile terminal by the MSC/VLR, the CK is used for encrypting and decrypting data, and the IK is used for verifying the data integrity and generating data verification digest. These operations will be described later.

The SKEY may be generated based on a random number and the authentication key. For example, when the mobile terminal and the network equipment negotiate to generate the SKEY, one of them may generates a random number and sends it to the other one; the network side conducts a calculation, e.g., a digest calculation, based on the random number and the authentication key stored by itself which corresponds to the user card in the mobile terminal to obtain a result which is taken as the SKEY. The mobile terminal conducts corresponding calculation based on the random number and the authentication key (KI) in the user card to obtain a result which is taken as the SKEY in the mobile terminal, e.g., the mobile terminal sends the random number to the user card, the user card conducts corresponding calculation based on the random number and the KI to obtain the SKEY needed by the mobile terminal and send the SKEY to the mobile terminal. The digest calculation algorithm may be chosen according to the practical implementation. Generating the SKEY based on the random number and the authentication key guarantees that the SKEY is not transmitted between the network equipment and the mobile terminal, and thus ensures the security of the SKEY. Such method also helps to replace the user card with the mobile terminal completely in the inter-authentication with the network.

As shown in FIG. 2, an SKEY corresponding to the mobile terminal is stored in an HLR/AUC first in Step 201.

In Step 202 the HLR/AUC generates an RAND with its random number generator.

In Step 203 the HLR/AUC calculates an XRES, a CK and an IK based on a KI stored in the HLR/AUC and an RAND generated by the HLR/AUC.

In Step 204, the HLR/AUC generates an MAC with the set SKEY corresponding to the mobile terminal, the RAND and an SQN. The SQN is a known value, e.g., a set value.

In Step 205 the HLR/AUC combines the MAC generated in Step 204 and the known SQN to obtain the AUTN.

In Step 206 the HLR/AUC combines an authentication set of the mobile terminal with the RAND, the AUTN generated in Step 205 and the XRES, CK and IK generated in Step 203.

In Step 207 the HLR/AUC sends the authentication set to the MSC/VLR.

In Step 208 the MSC/VLR extracts the RAND and the AUTN from the corresponding authentication set of the mobile terminal and sends them to the mobile terminal as the authentication information in this embodiment of the present invention.

Step 208 may be initiated by sending a trigger message by the mobile terminal to the network side. In practical applications, the MSC/VLR initiates an authentication request to the mobile terminal when the mobile terminal initiates a location update request or a service request, e.g., when the mobile terminal is turned on and logs in the network. Obviously, the location update request or the service request initiated by the mobile terminal can be understood as a request including the message that triggers authentication, and the MSC/VLR sends the authentication information to the mobile terminal upon the receipt of such a request.

Step 208 can be initiated by the network side, e.g., the network side initiates an authentication process when the mobile terminal does not initiate any relevant request for a long time; in such a case the trigger request from the mobile terminal is not needed.

When the AUTN includes an AMF, the AMF is further taken into consideration in Step 204, for example, the MAC can be generated based on the SKEY, RAND, SQN and the AMF; and the AMF is a knows value, e.g., a set value. The AMF is also taken into further consideration in Step 205, i.e., the AUTN may include the MAC, the SQN and the AMY.

Before Step 204, the method may further include a step of determining whether to generate the authentication information based on the SKEY, and if determine to generate the authentication information, proceed to Step 204; otherwise generate, according to the processes in the prior art, the authentication information directly based on the authentication key and the random number, e.g., generate the MAC based on the KI, the RAND, the SQN and the AMF, obtain the AUTN through corresponding combination processes and further obtain the authentication set.

Determining whether to generate the authentication information based on the SKEY can be made through setting a security indicator; when the security indicator includes a value, e.g., 1, indicating that it is needed to generate the authentication information based on the SKEY, the authentication information shall be generated based on the SKEY, when the security indicator includes a value, e.g., 0, indicating that it is not needed to generate the authentication information based on the SKEY, the authentication information shall not be generated based on the SKEY.

Alternatively, determining whether to generate the authentication information based on the SKEY is determining whether the SKEY includes a specified value, e.g., 0, if the SKEY does include the specified value 0, it is not needed to generate the authentication information based on the SKEY, otherwise the authentication information shall be generated based on the SKEY.

In the method described above, the HLR/AUC updates the SQN every time it generates an authentication set, i.e., every authentication set has a different SQN. The SQN can be updated through a specified algorithm which generates a new SQN based on the original SQN. The detailed operations are described in the relevant protocols of 3GPP 33.102/29.002.

Both of the HLR/AUC and the user card in the mobile terminal store an SQN in the prior art and the two SQNs should be synchronized before the authentication process. The SQN in the embodiment of the present invention may adopt the same SQN in the prior art, i.e., the SQN used for user card authentication, which is stored correspondingly by the network and the user card. The detailed description hereof can be found in the relevant protocols of 3GPP 33.102/29.002. Preferably, however, an independent SQN used for mobile terminal authentication is set in the embodiment of the present invention, and the mobile terminal and the HLR/AUC also synchronize the SQN. It is obviously understood that the independent SQN and the SQN stored in the user card may include the same value.

Usually the HLR/AUC sends the authentication set to the MSC/VLR in Step 207 after the authentication set request from the MSC/VLR is received, or when the authentication set stored in the MSC/VLR needs to be updated. Before sending an authentication to the MSC/VLR, the HLR/AUC usually generates multiple authentication sets so that one or multiple authentication sets can be sent to the MSC/VLR once an authentication set request is received from MSC/VLR, e.g., three authentication sets can be sent to the MSC/VLR once. Obviously the authentication set request from the MSC/VLR may further include the number of the authentication sets that are needed to be returned from the HLR/AUC. The HLR/AUC determines the number of the authentication sets that shall be sent to the MSC/VLR according to the request from the MSC/VLR and the number of the authentication sets it stores currently, e.g., when the HLR/AUC generates 5 authentication sets and the MSC/VLR requests 3, the HLR/AUC returns 3 authentication sets to the MSC/VLR; when the HLR/AUC generates 2 authentication sets and the MSC/VLR requests 3, the HLR/AUC returns 2 authentication sets to the MSC/VLR.

During the authentication process, e.g., when MSC/VLR receives a request triggering authentication from the mobile terminal, or when the mobile terminal needs to be authenticated, the MSC/VLR selects an authentication set from the authentication sets that are stored in the MSC/VLR and correspond to the mobile terminal, and sends the RAND, the AUTN and other authentication information in the selected authentication set to the mobile terminal. If the MSC/VLR finds that the authentication sets sent from the HLR/AUC are used up when selecting an authentication set, the MSC/VLR sends an authentication set request to the HLR/AUC.

In practical applications, an authentication set can be generated in the AUC and sent by the AUC to the HLR which stores the authentication set temporarily; when the authentication set request from the MSC/VLR is received, or when the authentication sets in the MSC/VLR need to be updated, one or multiple authentication sets are sent to the MSC/VLR which stores them. As the HLR and the AUC are usually integrated into one device in practical applications, they are referred to as the HLR/AUC in the embodiment of the present invention.

Accordingly, the MSC/VLR is a general name of the mobile switching center and the visitor location register, and in practical applications the VLR may store authentication sets, request authentication sets from the HLR and determines whether the mobile terminal authentication succeeds. As the VLR is usually installed as a module of the MSC, the MSC and the VLR are called by a joint name MSC/VLR in the embodiment of the present invention.

In Step 203 the HLR/AUC may calculate the XRES, CK and the IK based on the KI stored in the HLR/AUC and the RAND generated by the HLR/AUC. And in practical applications the HLR/AUC may also calculate the XRES, CK and the IK based on the SKEY stored in the HLR/AUC and the RAND generated by the HLR/AUC. In such a case the mobile terminal replaces the user card completely in the inter-authentication with the network. And in a preferable embodiment the SKEY of the mobile terminal is required to be generated based on the KI.

After setting the SKEY, the method may further include the step of updating the authentication sets stored in the MSC/VLR. Because when the SKEY is set, the authentication information in the authentication sets which are generated based on the former SKEY is invalidated, new authentication sets need to be generated and the authentication sets stored in the MSC/VLR need to be updated.

If a special SQN is set for mobile terminal authentication, the special SQN should be initialized again when the SKEY is set. Obviously, the SQN may also remain unchanged.

The generation of the authentication information by the network equipment is described above, and the authentication information generated by the network equipment is sent to corresponding mobile terminal. The following paragraphs deal with the processes after the mobile terminal receives the authentication information.

Figure 3:
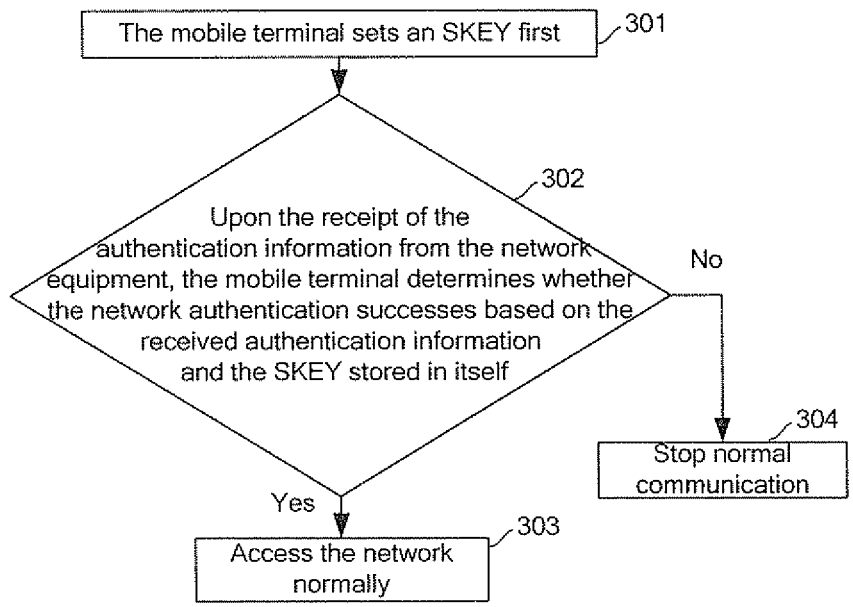
FIG. 3 is an overall flow chart of a mobile terminal authenticating a network in accordance with an embodiment of the present invention.

FIG. 3 is an overall flow chart of a mobile terminal authenticating a network in accordance with an embodiment of the present invention. As shown in FIG. 3, a mobile terminal sets a SKEY first in Step 301, the SKEY is usually consistent with the SKEY that is set and stored by the network equipment and corresponds to the network equipment itself.

In Step 302, upon receives the authentication information from the network equipment, the mobile terminal determines whether the network authentication succeeds based on the received authentication information and the SKEY stored in itself, if the authentication succeeds, the mobile terminal accesses the network normally in Step 303, otherwise the mobile terminal deems itself as an illegal terminal and stops normal communication in Step 304.

The step of stopping normal communication may includes prohibiting itself from accessing the network, or powering off or turning off directly, it may also include a step of sending short messages to friends or public security, etc.

Figure 4:
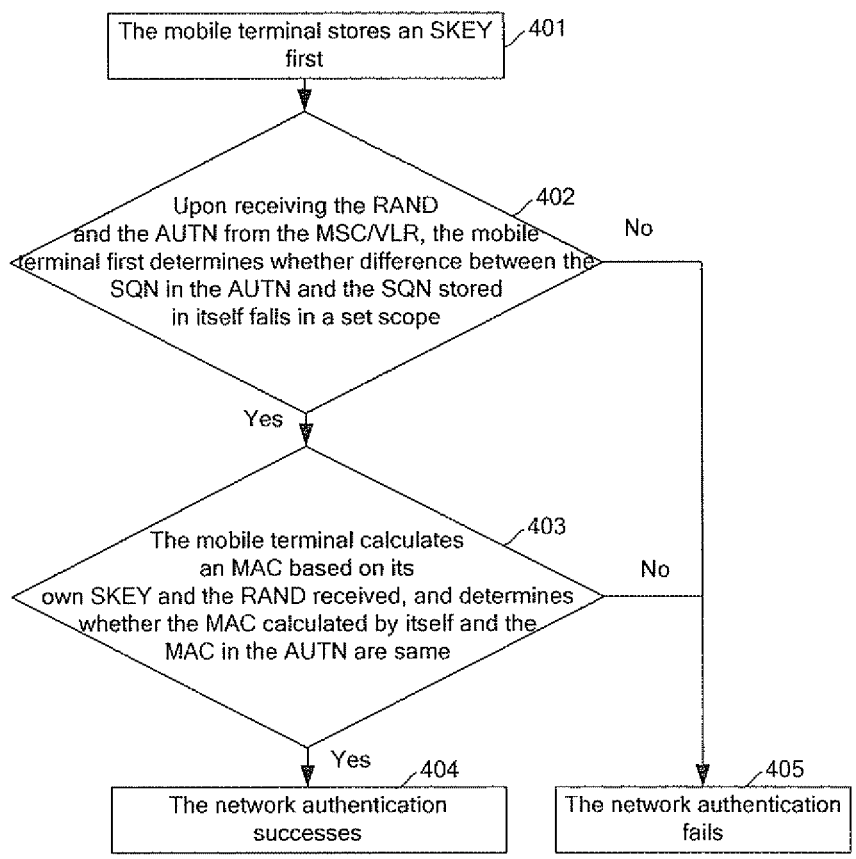
FIG. 4 is a flow chart of a mobile terminal authenticating a network in accordance with an embodiment of the present invention.

FIG. 4 shows an embodiment of network authentication performed by the mobile terminal in the processes shown in FIG. 2.

In Step 401, the mobile terminal stores an SKEY first, and the SKEY is consistent with the SKEY corresponding to the network equipment and stored therein. Usually the keys stored respectively by the mobile terminal and the network equipment are a pair of symmetric keys which are same in normal situations.

In Step 402, upon receives the RAND and the AUTN from the MSC/VLR, the mobile terminal first determines whether the AUTN is acceptable by determining the SQN in the AUTN. The mobile terminal and the network equipment in advance store a synchronized SQN respectively, so when the mobile terminal receives the authentication information from the network side, it compares the SQN stored in itself and the SQN in the AUTN received, and determines whether the difference between the two SQN satisfies a set condition so as to determine whether the AUTN is acceptable, where the set condition may be whether the difference between the SQN in the AUTN and the SQN stored by itself falls in a set scope. If the mobile terminal determines that the difference between the SQN in the AUTN and the SQN stored in the mobile terminal falls in the set scope, it determines that the AUTN is acceptable and the processes proceed to Step 403; otherwise the AUTN is deemed to be unacceptable and it is determined in Step 405 that the network authentication fails.

In Step 403, the mobile terminal calculates a MAC based on its own SKEY and the RAND received, and determines whether the MAC calculated by itself and the MAC in the AUTN are same, if they are same, it is determined in Step 404 that the network authentication succeeds, otherwise it is determined in Step 405 that the network authentication fails.

When the mobile terminal determines that the network authentication succeeds, the mobile terminal updates the SQN stored in the mobile terminal with the SQN in the AUTN received.

When the AUTN includes an AMF, the AMF is further taken into consideration in Step 403, for example, the MAC can be generated based on the SKEY of the mobile terminal itself, the RAND received, the SQN and the AMF, wherein the SQN and the AMF are from the AUTN.

Before Step 402 the method may further include a step of determining whether to perform the network authentication based on the SKEY, if the result of the determining is "yes", proceed to Step 402; otherwise the RAND is sent, according to the process in the prior art, to the user card which authenticates the network.

The decision about whether to perform network authentication based on the SKEY can be made through setting a security indicator; when the security indicator includes a value, e.g., 1, indicating that the network authentication based on the SKEY needs to be performed, the network authentication based on the SKEY shall be performed, when the security indicator includes a value, e.g., 0, indicating that network authentication based on the SKEY does not need to be performed, the network authentication based on the SKEY shall not be performed.

Another option through which the decision is made about whether to perform the network authentication based on the SKEY is determining whether the SKEY includes a specified value, e.g., 0, if the SKEY includes the specified value 0, the network authentication based on the SKEY does not need to be performed, otherwise the network authentication based on the SKEY shall be performed.

The SQN in the embodiment of the present invention may also adopt the same SQN in the prior art, i.e., the SQN used for user card authentication, which is stored by the network and the user card correspondingly. The detailed description hereof can be found in the relevant protocols of 3GPP 33.102/29.002. However, in a preferable embodiment of the present invention, an independent SQN used for mobile terminal authentication is set, and the mobile terminal and the HLR/AUC also synchronize the SQN. It can certainly be understood that the independent SQN and the SQN stored in the user card may include the same value.

As the SKEY stored in the mobile terminal is consistent, for example, with the SKEY stored in the network equipment, the SKEY in the mobile terminal may be the SKEY stored corresponding to the serial number or the IMSI of the user card. When the mobile terminal supports one user card only, the SKEY can be stored in the mobile terminal directly instead of corresponding to the serial numbers or the IMSIs of the supported user cards. When the mobile terminal supports more than one user cards and stores the SKEYs in accordance with the index numbers or the IMSIs of the supported user cards, the mobile terminal may choose a SKEY to perform the network authentication according to the index number or IMSI of the current user card. As multiple user cards can be supported in an extended embodiment of the present invention, and it is easy for those skilled in the art to develop practical applications based on the embodiment of the present invention, the situation wherein multiple user cards are supported is not described herein.

The process in which the network equipment generates the authentication information and the process in which the mobile terminal authenticates the network have been described above, respectively. And the authentication method provided by the embodiment of the present invention in a mobile communication network is described below with reference to FIG. 5.

Figure 5:
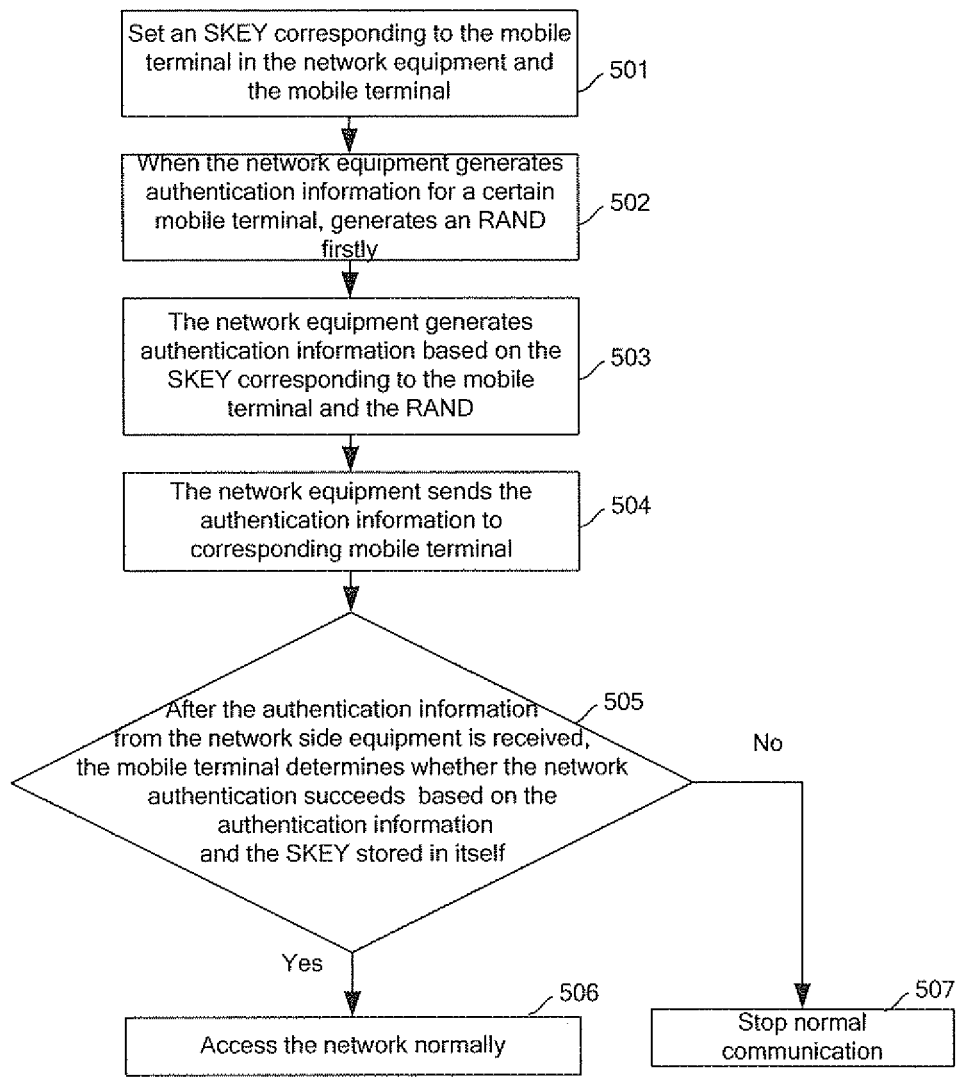
FIG. 5 is a flow chart of the overall authentication processes in accordance with an embodiment of the present invention.

As shown in FIG. 5, a SKEY corresponding to a mobile terminal for authentication is set in a network equipment and in the mobile terminal in Step 501. Obviously, the SKEY set by the network equipment may correspond to characteristic information of the mobile terminal or to the IMSI of the user card. The network equipment may also set the SKEY based on the MSISDN of the mobile telephone number of the user.

In Step 502, the network equipment first generates an RAND when generating the authentication information for the mobile terminal.

In Step 503, the network equipment generates the authentication information based on the SKEY corresponding to the mobile terminal and the RAND, In Step 504, the network equipment sends the authentication information to the corresponding mobile terminal.

In Step 505, upon receiving the authentication information from the network equipment, the mobile terminal determines whether the network authentication succeeds based on the received authentication information and the SKEY stored by itself, if the authentication succeeds, the mobile terminal accesses the network normally in Step 506, otherwise the mobile terminal deems itself as an illegal terminal and stops normal communication in Step 507.

When the mobile terminal determines that the network authentication succeeds, the mobile terminal updates the SQN stored in it with the SQN in the AUTN received.

Figure 6:
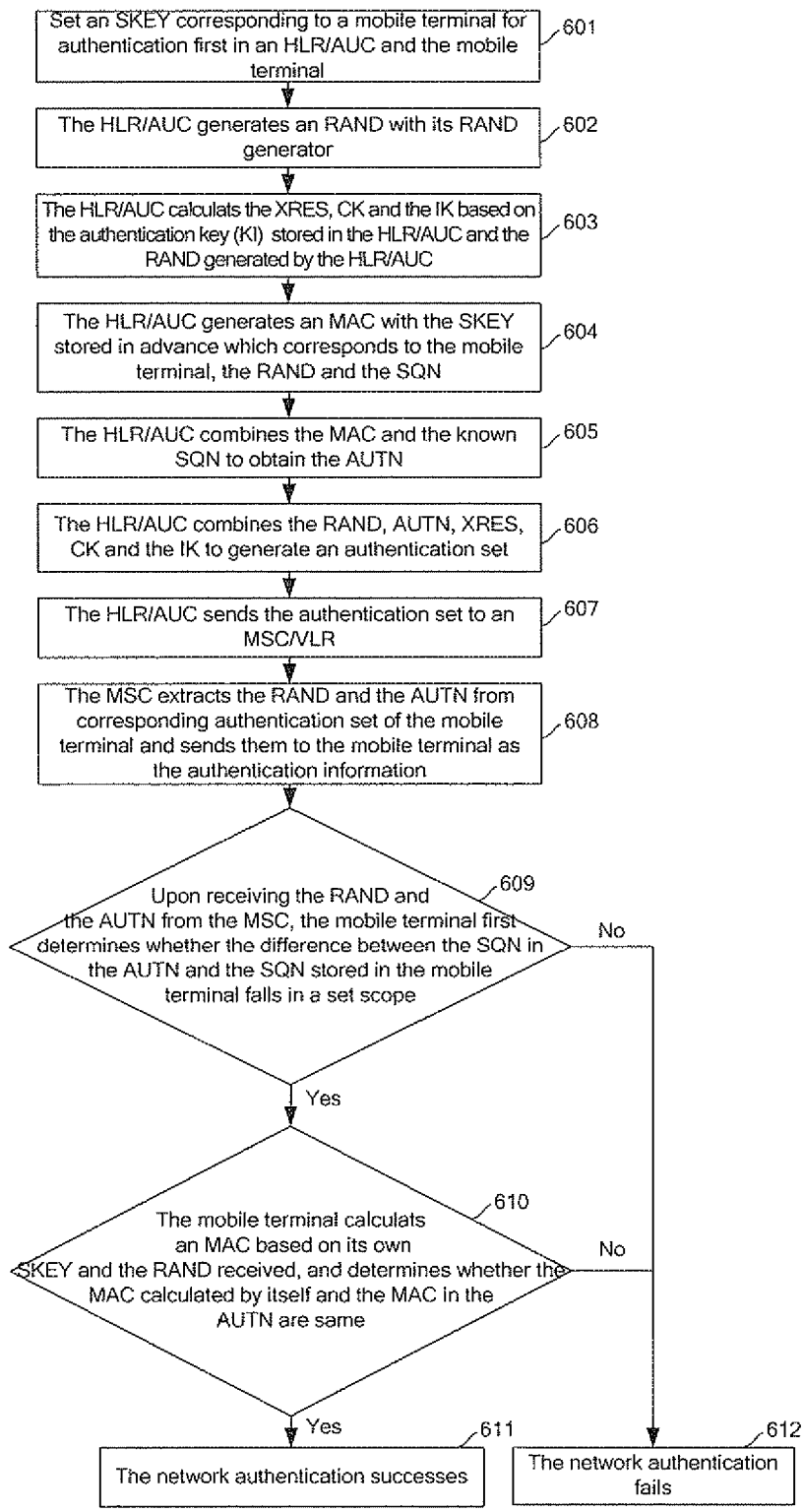
FIG. 6 is a flow chart of the overall authentication processes in accordance with an embodiment of the present invention.

A complete authentication process is described below with reference to the embodiments shown in FIG. 2 and FIG. 4. As shown in FIG. 6, an SKEY corresponding to a mobile terminal for authentication is set in an HLR/AUC and the mobile terminal in Step 601.

In Step 602 the HLR/AUC generates an RAND with its RAND generator.

In Step 603 the HLR/AUC calculates an XRES, a CK and an IK based on the KI stored in it and the RAND generated by it.

In Step 604, the HLR/AUC generates an MAC with the SKEY stored in advance which corresponds to the mobile terminal, the RAND and an SQN. The SQN is a known value, e.g., a set value.

In Step 605 the HLR/AUC combines the MAC and the known SQN to obtain an AUTN.

When the AUTN includes an AMF, the AMF is further taken into consideration in Step 604, for example, the MAC can be generated based on the SKEY, RAND, SQN and the AMF; the AMF is also a set value. The AMF is also taken into further consideration in Step 605, i.e., the AUTN may consist of the MAC, the SQN and the AMF.

In Step 606, the HLR/AUC combines the RAND, AUTN, XRES, CK and the IK to generate an authentication set.

In Step 607 the HLR/AUC sends the authentication set to the MSC/VLR.

In Step 608 the MSC/VLR extracts the RAND and the AUTN from corresponding authentication set of the mobile terminal and sends them to the mobile terminal as the authentication information in the embodiment of the present invention.

The step may be initiated by sending a trigger message by the mobile terminal to the network side. In practical applications, the MSC/VLR initiates an authentication request to the mobile terminal when the mobile terminal initiates a location update request or a service request, e.g., when the mobile terminal is turned on and logs on the network.

The step may also be initiated by the network side, e.g., the network side initiates an authentication process when the mobile terminal has not initiated any relevant request for a long time.

In Step 609, upon receiving the RAND and the AUTN from the MSC/VLR, the mobile terminal first determines whether the AUTN is acceptable, e.g., determines whether the difference between the SQN in the AUTN and the SQN stored in itself falls in a set scope, if the difference falls in a set scope, the mobile terminal determines that the AUTN is acceptable and proceed to Step 610; otherwise the AUTN is deemed to be unacceptable and it is determined in Step 612 that the network authentication fails. In such a case, the mobile terminal may send a synchronization command to the network side so that the SQNs stored in the mobile terminal and the network are synchronized. With regard to the SQN synchronization process, the SQN synchronization in the prior art serves as a good reference and is described in the relevant protocols of 3GPP 33.102/29.002, so the SQN synchronization process is not further described herein.

In Step 610, the mobile terminal calculates an MAC based on its own SKEY and the RAND received, and determines whether the MAC calculated by itself and the MAC in the AUTN are same, if they are same, it is determined in Step 611 that the network authentication succeeds, otherwise it is determined in Step 612 that the network authentication fails.

When the mobile terminal determines that the network authentication succeeds, the mobile terminal updates the SQN stored in it with the SQN in the AUTN received.

When the AUTN includes an AMF, the AMF is further taken into consideration in Step 610, for example, the MAC can be generated based on the SKEY of the mobile terminal itself, the received RAND, the SQN and the AMF, wherein the SQN and the AMF are from the AUTN.

The network authentication performed by a mobile terminal in an embodiment of the present invention has been described above, and an embodiment of the present invention further provides mobile terminal authentication performed by a network, wherein the follow-up steps are performed after Step 611 for a network to authenticate a mobile terminal.

Figure 7:
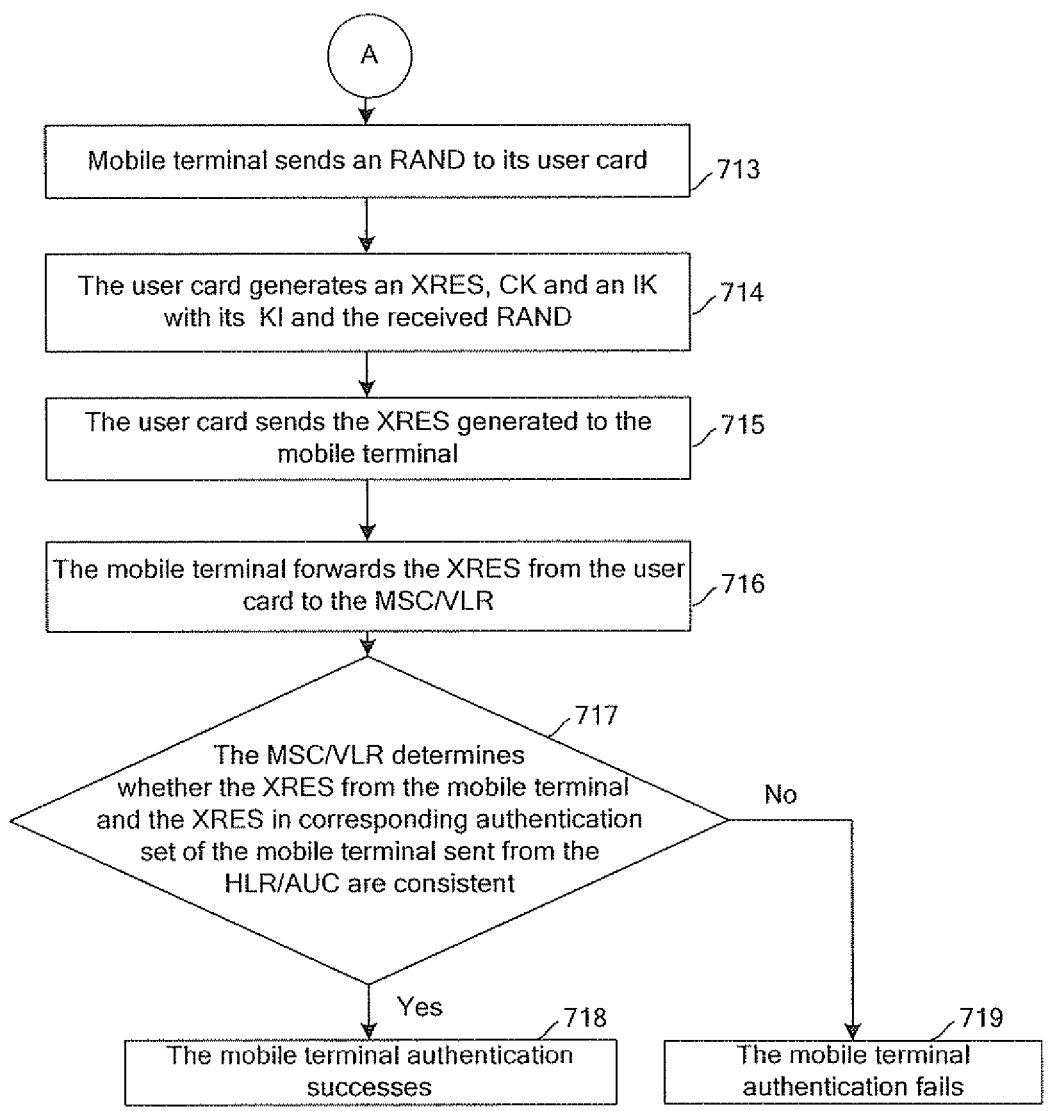
FIG. 7 is a flow chart of processes in which the terminal authentication performed by the network is added to the processes illustrated by FIG. 6.

As shown in FIG. 7, the steps from Step 701 to Step 712 are identical with the steps from Step 601 to Step 612; therefore these steps are not repeated in the description below and are represented with a letter A.

In Step 713, the mobile terminal sends the RAND to the user card.

In Step 714, the user card generates an XRES, a CK and an IK with its own KI and the received RAND.

In Step 715, the user card sends the XRES generated to the mobile terminal.

In Step 716, the mobile terminal forwards the XRES from the user card to the MSC/VLR.

In Step 717, the MSC/VLR determines whether the XRES from the mobile terminal and the XRES in corresponding authentication set of the mobile terminal sent from the HLR/AUC are consistent. If they are consistent, it is determined in Step 718 that the mobile terminal authentication succeeds; otherwise it is determined in Step 719 that the mobile terminal authentication fails.

In Step 713, when sending the RAND, the mobile terminal may send the AUTN at the same time in order to make the process compatible with the handling process in the prior art, so that the user card can further authenticate the network according to the AUTN and its own KI. In such a case, the mobile terminal may set the AUTN as a special value which is sent to the user card, indicating that the mobile terminal shall authenticate the network. When the user card finds that the AUTN is the special value, it just generates an XRES, a CK and an IK with the KI and RAND, and no longer authenticates the network with the AUTN and the KI.

During the process of generating the XRES, CK and IK with the KI and the RAND, the user card may generate the XRES and the CK only and send them to the mobile terminal which educes the IK based on the CK.

In Step 716, before the mobile terminal forwards the XRES from the user card to the MSC/VLR, the method may further include a step of determining whether the network is the 2nd generation mobile communication network, if the network is the 2nd generation mobile communication network, deducing an SRES2g (Signed Response) and a KC2g (Cipher Key) by the mobile terminal based on the XRES, CK and IK, sending the SRES2g instead of the XRES to the MSC/VLR and utilizing the KC2g to encrypt and decrypt the communication to the network side. The relative deduction method is suggested in the relevant current protocols of 3GPP and is not described herein.

In addition, the authentication in the 2nd generation mobile communication network is described in GSM 03.20 and GSM 09.02.

Figure 8:
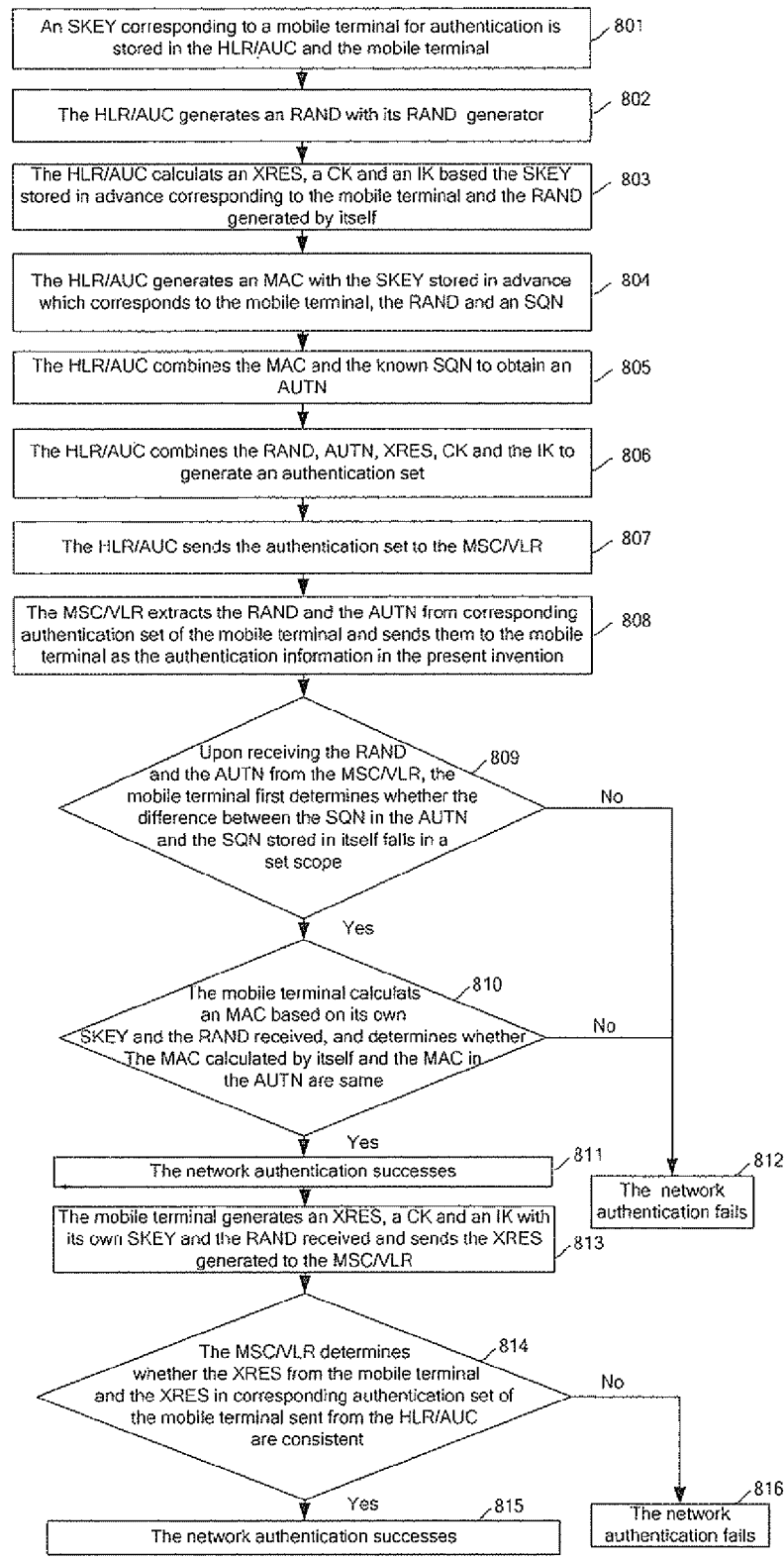
FIG. 8 is a flow chart of the overall authentication process in accordance with another embodiment of the present invention.

The XRES, CK and IK may also be generated based on the SKEY and the RAND. In such a case, another embodiment of the present invention is shown in FIG. 8.

In Step 801, a SKEY corresponding to a mobile terminal for authentication is stored in an HLR/AUC and the mobile terminal.

In Step 802 the HLR/AUC generates a RAND with its RAND generator.

In Step 803 the HLR/AUC calculates an XRES, a CK and an IK based the SKEY stored in advance corresponding to the mobile terminal and the RAND generated by itself.

In Step 804, the HLR/AUC generates an MAC with the SKEY stored in advance which corresponds to the mobile terminal, the RAND and the SQN. The SQN is a known value, e.g., a set value.

In Step 805 the HLR/AUC combines the MAC and the known SQN to obtain an AUTN.

When the AUTN includes an AMF, the AMF is further taken into consideration in Step 804, for example, the MAC can be generated based on the SKEY, RAND, SQN and the AMF; the AMF is also a set value. The AMF is also taken into further consideration in Step 805, i.e., the AUTN may consist of the MAC, the SQN and the AMF.

In Step 806, the HLR/AUC combines the RAND, AUTN, XRES, CK and the IK to generate an authentication set.

In Step 807 the HLR/AUC sends the authentication set to the MSC/VLR.

In Step 808 the MSC/VLR extracts the RAND and the AUTN from corresponding authentication set of the mobile terminal and sends them to the mobile terminal as the authentication information in the embodiment of the present invention.

In Step 809, upon receiving the RAND and the AUTN from the MSC/VLR, the mobile terminal first determines whether the AUTN is acceptable, e.g., determines whether the difference between the SQN in the AUTN and the SQN stored by itself falls in a set scope, if the difference does fall in a set scope, the mobile terminal determines that the AUTN is acceptable and proceed to Step 810; otherwise the AUTN is deemed to be unacceptable and it is determined in Step 812 that the network authentication fails. In such a case, the mobile terminal may send a command that is SQN unacceptable to the network side, e.g., a synchronization command to synchronize the SQN, so that corresponding SQNs stored in the mobile terminal and the network are synchronized.

In Step 810, the mobile terminal calculates an MAC based on its own SKEY and the RAND received, and determines whether the MAC calculated by itself and the MAC in the AUTN are same, if they are same, it is determined in Step 811 that the network authentication succeeds, otherwise it is determined in Step 812 that the network authentication fails.

When the mobile terminal determines that the network authentication succeeds, the mobile terminal updates the SQN stored in it with the SQN in the AUTN received.

When the AUTN includes an AMF, the AMF is farther taken into consideration in Step 810, for example, the MAC can be generated based on the SKEY of the mobile terminal itself, the received RAND, the SQN and the AMF, wherein the SQN and the AMF are from the AUTN.

In Step 813, the mobile terminal generates an XRES, a CK and an IK with its own SKEY and the RAND received, and sends the XRES generated to the MSC/VLR.

In Step 814, the MSC/VLR determines whether the XRES from the mobile terminal and the XRES in corresponding authentication set of the mobile terminal sent from the HLR/AUC are consistent. If they are consistent, it is determined in Step 815 that the mobile terminal authentication succeeds; otherwise it is determined in Step 816 that the mobile terminal authentication fails.

In the method described above, network equipment, such as MSC/VLR, may send authentication information to the mobile terminal in one pack or through multiple communications. For example, it may send the random number RAND in the first communication, the authentication token AUTN in the second communication, etc. In practical applications, the network protocol capability determines how many times of communication it should take to send the authentication information. For instance, in a UMTS network the MSC/VLR may send authentication information including the RAND and the AUTN to the mobile terminal in one pack through an authentication command while in a 2nd generation mobile communication network the MSC/VLR may send authentication information including the RAND and the AUTN to the mobile terminal through two or more authentication commands.

The algorithm adopted in the embodiment of the present invention to generate the random number, authentication set, XRES, CK, IK and MAC may be the algorithm provided or suggested in current 3GPP protocols, yet it may also be determined independently in implementation. The authentication in 3rd generation mobile communication network is described in 3G TS 33.102 and 3G TS 29.002.

The MSC/VLR described above is a circuit domain device, and corresponding device of MSC/VLR in a network of packet switched domain can be an SGSN.

The foregoing description is only preferred embodiments of this invention and is not for use in limiting the protection scope thereof. All the modifications, equivalent replacements or improvements in the scope of the spirit and principles of the present invention shall be included in the protection scope of the present invention.

What is claimed is:

1. A method for a mobile terminal to authenticate network in a mobile communication network, comprising:
   setting a terminal security key in the mobile terminal wherein the terminal security key is set in the mobile terminal itself, not in a user card adopted therein;
   wherein, the terminal security key consists with a network security key set and stored in a network equipment;
   wherein, the network security key corresponds to the mobile terminal, not corresponds to the user card adopted therein;
   upon receiving authentication information from the network equipment, determining by the mobile terminal whether a network authentication succeeds based on the received authentication information and the terminal security key stored in the mobile terminal;
   wherein, the determining process is performed by the mobile terminal itself, not by a user card adopted therein;
   if the network authentication fails, the mobile terminal stops normal communications.

2. The method of claim 1, wherein the authentication information comprises: a random number and an authentication token which comprises at least a serial number and a message authentication code.

3. The method of claim 2, wherein the process of the mobile terminal determining whether the network authentication succeeds based on the security key in the mobile terminal and the authentication information comprises:
   generating a message authentication code of the mobile terminal by calculating according to the security key in the mobile terminal, the serial number and the random number;
   comparing the message authentication code with the message authentication code in the authentication information to determine whether the message authentication code is consistent with the message authentication code in the authentication information, if yes, the network authentication being successful, otherwise the network authentication being unsuccessful.

4. The method of claim 3, further comprising:
   before calculating the message authentication code, determining whether difference between the serial number in the received authentication information and a serial number set by the mobile terminal falls in a set scope, if the difference falls in the set scope, calculating the message authentication code; otherwise the network authentication being unsuccessful.

5. The method of claim 3, wherein the authentication token further comprises an authentication management field; and the authentication management field is further taken into the calculation through which the message authentication code is calculated based on the security key in the mobile terminal, the random number and the serial number.

6. The method of claim 2, wherein the serial number is a serial number for authenticating a user card of the mobile terminal; or the method further comprises setting a serial number corresponding to the mobile terminal authentication;
   wherein the serial number in the process of determining whether a network authentication succeeds is the serial number corresponding to mobile terminal authentication.

7. The method of claim 1, further comprising: before determining whether the network authentication succeeds, determining whether to perform the process of determining whether the network authentication succeeds, and determining whether the network authentication succeeds, if determine to perform the step determining whether the network authentication succeeds.

8. The method of claim 1, further comprising: before determining whether the network authentication succeeds, sending a request by the mobile terminal to the network equipment to trigger authentication.

9. The method of claim 1, wherein the process of determining whether the network authentication succeeds further comprises: generating an expected response, an encryption key and an integrity key based on the security key and the random number, and returning the expected response to the network equipment.

* * * * *